US012693238B2

(12) United States Patent
Choi et al.

(10) Patent No.: US 12,693,238 B2
(45) Date of Patent: Jul. 28, 2026

(54) METHOD FOR MEASURING DEPTH OF DAMAGED LAYER AND CONCENTRATION OF DEFECTS IN DAMAGED LAYER, AND SYSTEM FOR PERFORMING SAME METHOD

(71) Applicant: EHWA DIAMOND INDUSTRIAL COMPANY LIMITED, Osan-si (KR)

(72) Inventors: Seong Kwon Choi, Anyang-si (KR); Heedong Park, Yongin-si (KR)

(73) Assignee: EHWA DIAMOND INDUSTRIAL COMPANY LIMITED, Osan-si (KR)

(*) Notice: Subject to any disclaimer, the term of this patent is extended or adjusted under 35 U.S.C. 154(b) by 139 days.

(21) Appl. No.: 18/698,572

(22) PCT Filed: Oct. 5, 2021

(86) PCT No.: PCT/KR2021/013634
§ 371 (c)(1),
(2) Date: May 15, 2024

(87) PCT Pub. No.: WO2023/058784
PCT Pub. Date: Apr. 13, 2023

(65) Prior Publication Data
US 2024/0402094 A1 Dec. 5, 2024

(51) Int. Cl.
*G01N 21/95* (2006.01)
*G01B 11/22* (2006.01)
*G01N 21/956* (2006.01)

(52) U.S. Cl.
CPC ......... *G01N 21/9505* (2013.01); *G01B 11/22* (2013.01); *G01N 21/956* (2013.01)

(58) Field of Classification Search
CPC .. G01N 21/9505; G01N 21/956; G01N 21/95; G01N 21/9501; G01N 21/88; H01L 21/3221; H01L 22/12; G01B 11/22
See application file for complete search history.

(56) References Cited

U.S. PATENT DOCUMENTS

| | | | |
|---|---|---|---|
| 6,157,444 A | 12/2000 | Tomita et al. | |
| 2013/0329222 A1* | 12/2013 | Kudo | G01N 21/956 356/237.5 |
| 2016/0334342 A1* | 11/2016 | Chuang | H04N 25/715 |

FOREIGN PATENT DOCUMENTS

| | | |
|---|---|---|
| CN | 113324487 A | 8/2021 |
| EP | 0319797 B1 | 1/1996 |

(Continued)

OTHER PUBLICATIONS

Marani Roberta, "Extended European Search Report in European Application No. 21959996.6", Jul. 2, 2025, EPO, Germany.

*Primary Examiner* — Kara E. Geisel
*Assistant Examiner* — Christina I Xing
(74) *Attorney, Agent, or Firm* — Bridgeway IP Law Group, PLLC; Jihun Kim

(57) ABSTRACT

There is provided a method of determining a depth of a damage layer formed on a back surface of the substrate. The method comprises irradiating the damage layer with first light and second light; detecting the first light and the second light reflected or scattered by defects in the damage layer; determining a first penetration depth of the first light and a second penetration depth of the second light based on a first wavelength of the first light and a second wavelength of the second light; and determining the depth of the damage layer based on the first penetration depth and the second penetration depth.

6 Claims, 7 Drawing Sheets

(56)          References Cited

FOREIGN PATENT DOCUMENTS

| | | | | |
|----|----|----|----|----|
| JP | H07294422 | A | * | 11/1995 |
| JP | H09229856 | A | * | 9/1997 |
| JP | 4500641 | B2 | | 7/2010 |
| JP | 2016-531313 | A | | 10/2016 |
| KR | 10-2007-0065732 | A | | 6/2007 |
| KR | 10-1606093 | B1 | | 3/2016 |
| KR | 10-2019-0062189 | A | | 6/2019 |
| KR | 10-2320506 | B1 | | 11/2021 |
| TW | 429309 | B | | 4/2001 |
| TW | 200702653 | A | | 1/2007 |
| TW | 201921125 | A | | 6/2019 |
| WO | 2016-002624 | A1 | | 1/2016 |

* cited by examiner

METHOD FOR MEASURING DEPTH OF DAMAGED LAYER AND CONCENTRATION OF DEFECTS IN DAMAGED LAYER, AND SYSTEM FOR PERFORMING SAME METHOD

TECHNICAL FIELD

The present disclosure relates to a method of measuring a depth of a damage layer and a concentration of defects in the damage layer, and a system for performing the method.

BACKGROUND ART

In accordance with the trend of miniaturizing and reducing the weight of semiconductor packages, a thickness of a wafer is reduced by grinding a back surface of the wafer.

However, as the thickness of the wafer decreases, foreign objects such as metal ions such as copper (Cu) penetrate into the back surface of the wafer. To prevent foreign objects from penetrating, a damage layer is formed on the back surface of the wafer.

A transmission electron microscopy (TEM) method is currently used to determine whether the damage layer has been formed at an appropriate depth (thickness). However, the TEM method is a destructive inspection method and has the problem of requiring a separate specimen for measurement.

DISCLOSURE

Technical Problem

According to one embodiment of the present disclosure, the present disclosure provides a method of determining a depth of a damage layer using a concentration of defects according to a wavelength of light that the damage layer is irradiated with.

The aspects of the present disclosure are not limited to the foregoing, and other aspects not mentioned herein will be clearly understood by those skilled in the art from the following description.

Technical Solution

In accordance with an aspect of the present disclosure, there is provided a method of determining a depth of a damage layer formed on a back surface of the substrate, the method comprises: irradiating the damage layer with first light and second light having a different wavelength from the first light; detecting the first light and the second light reflected or scattered by defects in the damage layer; determining a first penetration depth of the first light and a second penetration depth of the second light based on a first wavelength of the first light and a second wavelength of the second light; determining a number of defects present in a first area corresponding to the first penetration depth or concentration of defects present in the first area using the detected first light; determining a number of defects present in a second area corresponding to the second penetration depth or concentration of defects present in the second area using the detected second light; determining a number of defects present in a third area that is not included in the second area among the first areas or concentration of defects present in the third area using the number or concentration of defects present in the first area and the number or the concentration of defects present in the second area; and determining the depth of the damage layer based on the number or the concentration of defects present in each of the first area, the second area, and the third area.

The first penetration depth may be deeper than the second penetration depth, when the first wavelength is longer than the second wavelength.

The second penetration depth may be determined as the depth of the damage layer when first information indicated by the detected first light and second information indicated by the detected second light are the same in the determining the depth of the damage layer.

The second penetration depth may be determined as the depth of the damage layer when the number or concentration of defects for the first penetration depth and the number or concentration of defects for the second penetration depth are the same in the determining the depth of the damage layer.

The method further comprises determining the concentration of defects in the first area corresponding to the first penetration depth using the detected first light; determining the concentration of defects in the second area corresponding to the second penetration depth using the detected second light; and determining the concentration of defects in the third area that is not included in the second area among the first areas using the number or the concentration of defects present in the first area and the number or the concentration of defects present in the second area.

The method further comprises determining the concentration of defects in the first area using the number or the concentration of defects present in the first area; determining the concentration of defects in the second area using the number or the concentration of defects present in the second area; and determining the concentration of defects in the third area using the number or the concentration of defects present in the third area.

In the irradiating the damage layer with the first light and the second light, the first light and the second light may be simultaneously irradiated to the damage layer, and the first light and the second light may correspond to light dispersed from white light.

In the irradiating the damage layer with the first light and the second light, the first light and the second light may be sequentially irradiated.

The substrate may be a silicon substrate.

In accordance with another aspect of the present disclosure, there is provided a measurement system for determining a depth of a damage layer formed on a back surface of a substrate, the system comprises: a light irradiator configured to irradiate the damage layer with first light and second light having a different wavelength from the first light; a light detector configured to detect the first light and the second light reflected or scattered by defects in the damage layer; and a determination device configured to receive information on the first light and information on the second light from the light detector, wherein the determination device is configured to: determine a first penetration depth of the first light and a second penetration depth of the second light based on a first wavelength of the first light and a second wavelength of the second light, determine a number of defects present in a first area corresponding to the first penetration depth or concentration of defects present in the first area using the detected first light, determine a number of defects present in a second area corresponding to the second penetration depth or concentration of defects present in the second area using the detected second light, determine a number of defects present in a third area that is not included in the second area among the first areas or concentration of defects present in the third area using the number or the concentration of defects present in the first area and the number or the concentration of defects present in the second area, and determine the depth of the damage layer based on the number or the concentration of defects present in each of the first area, the second area, and the third area.

Advantageous Effects

According to one embodiment of the present disclosure, by determining the depth of the damage layer using the concentration of defects according to the wavelength of light that the damage layer is irradiated with, it is possible to obtain the depth of the damage layer in the non-destructive manner.

BEST MODE

Figure 1:
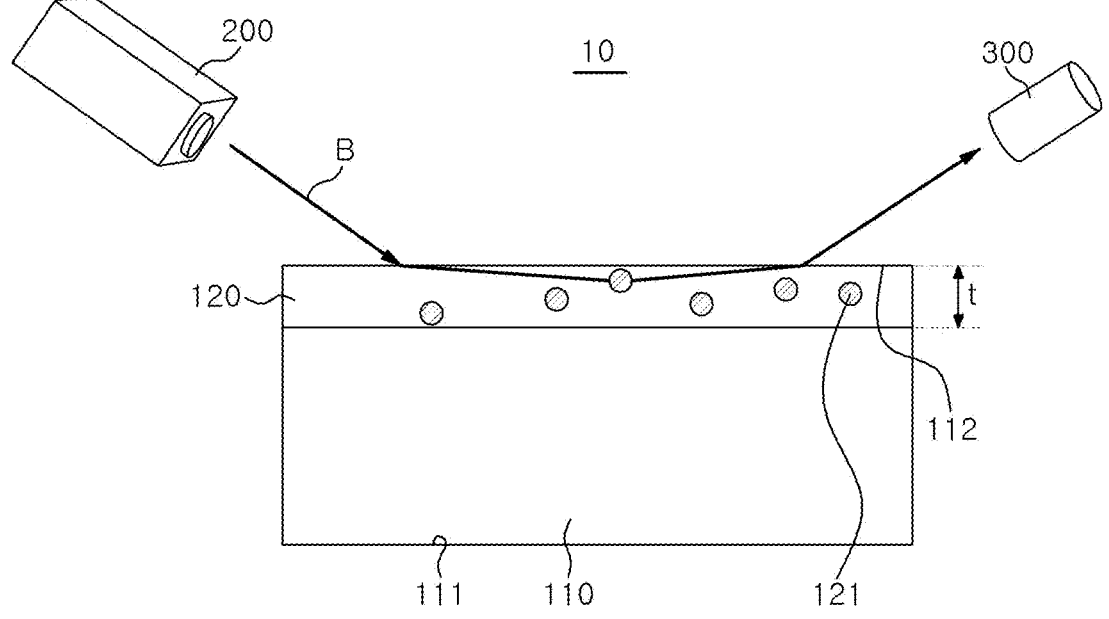
FIG. 1 illustrates a flowchart illustrating a measurement system for determining a depth of a damage layer and concentration of defects in the damage layer according to an embodiment of the present application.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure. Furthermore, the terms used herein are defined based on the functions in the embodiments of the present disclosure and may vary depending on the user's, operator's intention, or convention. Therefore, their definitions should be inferred from the contents throughout this specification.

FIG. 1 illustrates a measurement system for determining a depth of a damage layer and concentration of defects in the damage layer according to an embodiment of the present application.

Referring to FIG. 1, a measurement system 10 may include a substrate 110, a damage layer 120, a light irradiator 200, and a light detector 300.

The substrate 110 may be configured so that various types of components can be mounted.

According to an embodiment, the substrate 110 may be a silicon substrate. Infrared light completely penetrates through the silicon substrate, and the silicon substrate has the property in which the shorter the wavelength of light, the higher the light absorption rate and the lower the penetration depth. Therefore, some spectra of light near visible light may be absorbed by a thin film of the silicon substrate (at the depth of the damage layer or a Si thickness of the wafer), but some of the light may penetrate to a certain depth.

The substrate 110 may include a top surface 111 on which electronic devices (not illustrated) may be mounted/attached, and a back surface 112 that is a surface opposite to the top surface 111.

The damage layer 120 is configured to prevent/alleviate external foreign objects (especially, metal ions such as copper) from penetrating into the substrate 110. The damage layer 120 may be formed inside the back surface 112 of the substrate 110 by grinding.

According to the embodiment, a depth t of the damage layer 120 may be 1 micron or more and 30 microns or less.

The light irradiator 200 may radiate light B to the back surface of the damage layer 120 in order to measure the depth of the damage layer 120 and the degree of distribution by depth (i.e., concentration by depth) of defects 121 within the damage layer 120. In this specification, the defects 121 may include point defects, line defects, and surface defects.

The light B irradiated from the light irradiator 200 includes, but is not limited to, white light, LED, blue laser, green laser, and red laser. In other words, the light B irradiated from the light irradiator 200 may be a type of light appropriate for measuring the depth of the damage layer 120 and the concentration of the defects 121 within the damage layer 120.

In addition, in this specification, only visible light such as red light, green light, and blue light is described for convenience of description, but the light is not limited thereto. That is, in this specification, the light B may include not only visible light but also light of near-infrared and near-ultraviolet wavelengths.

When the light B irradiated from the light irradiator 200 is reflected from the surface of the damage layer 120 or scattered inside the damage layer 120 due to the defects 121 in the damage layer 120, etc., the light detector 300 may detect the reflected or scattered light.

The light detector 300 may include a phototube to detect the reflected or scattered light. According to an embodiment, in order to detect lights of various wavelengths (or wavelength ranges, hereinafter referred to as 'wavelength'), the light detector 300 may include a plurality of phototubes, or the measurement system 10 may include one or more light detectors 300 including one or more phototubes.

Since the light B is reflected from the surface of the damage layer 120 or scattered by the defects 121 in the damage layer 120, the light B detected by the light detector 300 may include information on the number of defects 121 in the damage layer 120, the depth of the damage layer 120, and/or the depth at which light (B) penetrates the damage layer 120.

Accordingly, a determination device (400 in FIG. 2) may analyze the detected light B and determine the concentration of the defects 121 and the depth of the damage layer 120 depending on the penetration depth of the light B. Here, the penetration depth refers to the depth through which the light B has penetrated, and may be calculated based on the surface of the damage layer 120 (the surface opposite to the surface in contact with the substrate 110).

An absorption depth of the light B may vary depending on the wavelength of the light B. More specifically, the longer the wavelength of the light B, the deeper the absorption depth of the light B may be. For example, the absorption depth of red light with a wavelength of 630 to 780 nm may be 350 to 1000 μm, the absorption depth of green light with a wavelength of 495 to 570 nm may be 90 to 200 μm, and the absorption depth of blue light with a wavelength of 450 to 495 nm may be 40 to 90 μm, but is not limited thereto.

Here, the absorption depth may refer to a depth when the intensity of the light B becomes 36% (i.e., 1/e) of initial intensity since the light B irradiated from the light irradiator 200 is absorbed by the damage layer 120 as it penetrates the damage layer 120 to a certain depth. In this case, when the light B that penetrates to the absorption depth is reflected or scattered by the defects 121 in the damage layer 120 and detected by the light detector 300, the intensity of the light B detected by the light detector 130 may be 13% (=36%*36%) of the initial intensity.

In this specification, for convenience of description, a maximum depth detectable by the light detector 300 is described based on 1 absorption depth, but is not limited thereto. That is, according to the embodiment, the maximum depth detectable by the light detector 300 may have values other than the 1 absorption depth.

The determination device (400 in FIG. 2) may analyze a plurality of lights having different wavelengths to determine the degree of distribution of the defects 121 by the depth of the damage layer 120.

Figure 2:
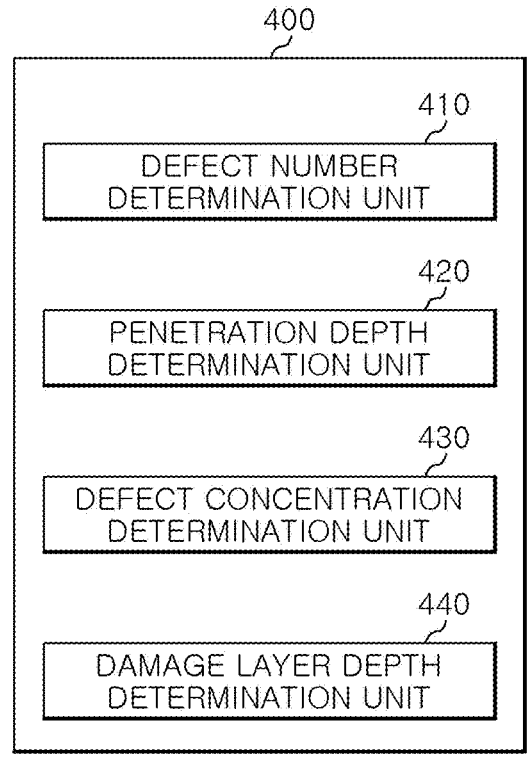
FIG. 2 is a block diagram conceptually illustrating the function of the determination device that determines the depth of the damage layer and the concentration of defects in the damage layer, according to an embodiment of the present application.

FIG. 2 is a block diagram conceptually illustrating the function of the determination device that determines the depth of the damage layer and the concentration of defects in the damage layer, according to an embodiment of the present application.

Referring to FIGS. 1 and 2, the determination device 400 may include a defect number determination unit 410, a penetration depth determination unit 420, a defect concentration determination unit 430, and a damage layer depth determination unit 440.

For the defect number determination unit 410, the penetration depth determination unit 420, the defect concentration determination unit 430, and the damage layer depth determination unit 440 illustrated in FIG. 2, in order to easily describe the function of the determination device 400, the functions performed by the determination device 400 are conceptually divided, and the present disclosure is not limited thereto. According to the embodiments, the functions of the defect number determination unit 410, the penetration depth determination unit 420, the defect concentration determination unit 430, and the damage layer depth determination unit 440 can be merged/separated, and may be implemented as a series of instructions included in one program.

The defect number determination unit 410 may use the information on the light B received from the light detector 300 to determine the number or concentration of defects within the damage layer 120 detected at a predetermined position and a range R where the light B is irradiated.

Since the penetration depth of the light B varies depending on the wavelength of the light B, the number or concentration of defects in the damage layer 120 may be determined depending on the wavelength of the light B. That is, even if the light B is radiated at the same position and range, when the wavelength of the irradiated light B is different, the number or concentration of detected defects may be different.

The penetration depth determination unit 420 may determine the penetration depth of the light B at a predetermined position and range based on the wavelength of the light B.

The defect concentration determination unit 430 may determine the concentration of defects within the damage layer 120 at a predetermined position, range, and depth using information on a plurality of lights having different wavelengths.

The damage layer depth determination unit 440 may determine the depth of the damage layer 120 using distribution degrees of defects depending on the light penetration depth.

Figure 4:
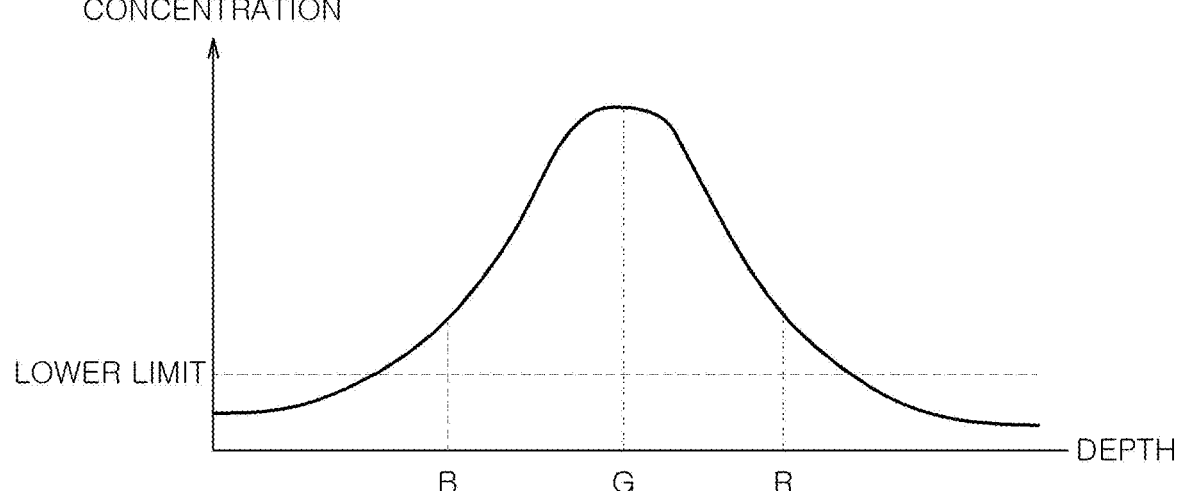
FIG. 4 illustrating a method of determining a depth of a damage layer according to an embodiment of the present application.

Referring further to FIG. 4, the concentration of defects of the damage layer 120 determined by the defect concentration determination unit 430 may be represented as a graph with respect to the depth of the damage layer 120. According to the embodiment, when the graph of the concentration and depth of defects represents a normal distribution curve, the damage layer depth determination unit 440 may determine the depth of the damage layer 130 according to the changed trend of the graph. That is, the damage layer depth determination unit 440 may estimate the depth of the damage layer 120 from the concentration of the defect 121, based on the graph of the concentration of defects and the depth of the damage layer 120. In this case, when the concentration of the defects 121 determined by the defect concentration determination unit 430 is less than or equal to a preset lower limit, the value may be determined to be noise and not used to estimate the depth of the damage layer 120.

In addition, when the light irradiator 200 irradiates a larger number of lights with further subdivided wavelengths, the graph of the concentration of defects and the depth of the damage layer 120 may be created in more detail, so the accuracy of estimation of the damage layer 120 may be increased.

Alternatively, according to another embodiment, the damage layer depth determination unit 440 may determine the damage layer to be the depth at which defects are found, according to the determination of the defect concentration determination unit 430.

FIG. 3 illustrates an example of determining the depth of the damage layer and the concentration of defects within the damage layer.

Figure 3A:
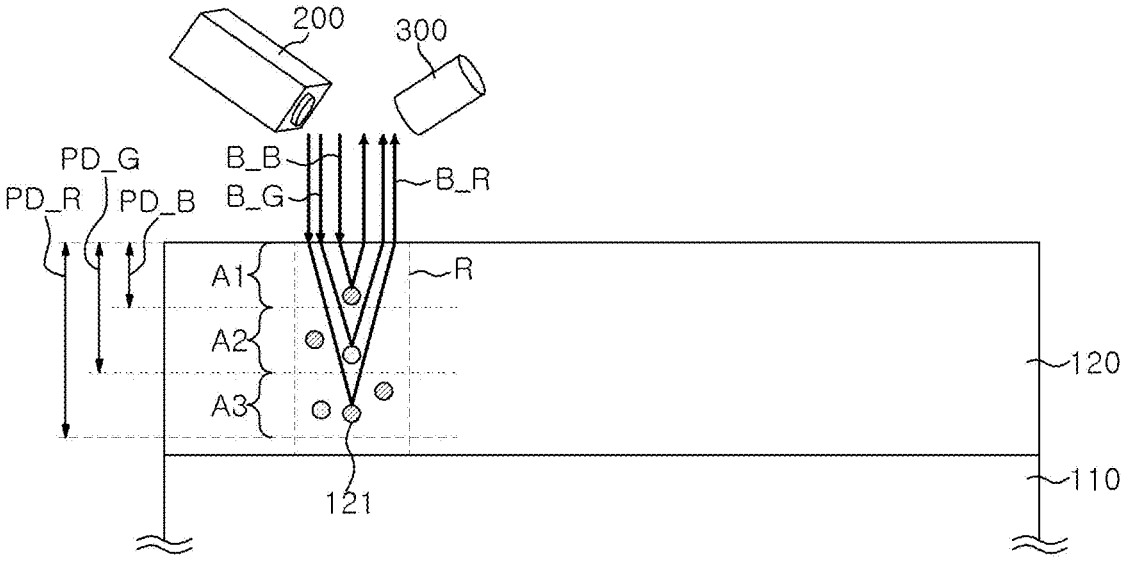
FIGS. 3A and 3B illustrate an example of determining the depth of the damage layer and the concentration of defects within the damage layer.
Figure 3B:
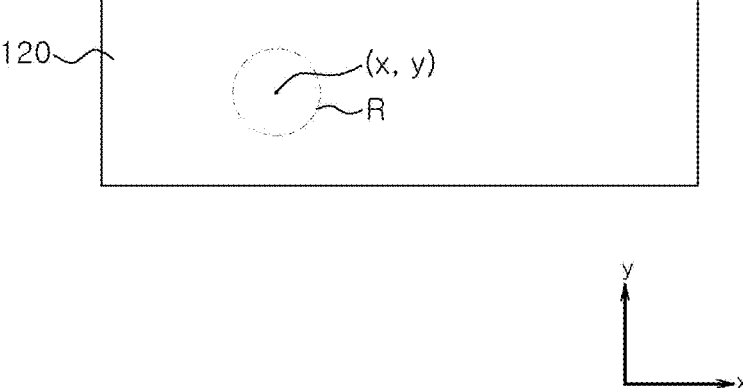

Referring to FIGS. 1 and 3, FIG. 3A illustrates a cross-sectional view of the damage layer 120 when viewed from the side, and FIG. 3B illustrates a cross-sectional view of the damage layer 120 when viewed from above.

When the light irradiator 200 radiates red light B_R, green light B_G, and blue light B_B with different wavelengths in a predetermined range R to the damage layer 120 simultaneously or at different time, the light detector 300 may detect the red light B_R, the green light B_G, and the blue light B_B reflected or scattered by the defect 121 in the damage layer 120.

In this specification, for convenience of description, the predetermined range R in which the light irradiator 200 radiates light is expressed as a circle, but is not limited thereto. That is, the predetermined range R in which light is radiated may vary according to the embodiment. In addition, the range R in which light is radiated may change according to the embodiment.

When transmitting information on the blue light B_B irradiated in the predetermined range R according to the red light B_R detected by the light detector 300, the defect number determination unit 410 may determine the number of defects 121 (e.g., 1) for a penetration depth PD_B of the blue light B_B.

Similarly, when the light detector 300 transmits the information on the green light B_G radiated in the predetermined range R, the defect number determination unit 410 may determine the number of defects 121 (e.g., 3) for the penetration depth PD_G of the green light B_G, and when the light detector 300 transmits the information on the red light B_R radiated in the predetermined range R, the defect number determination unit 410 may determine the number of defects 121 (e.g., 6) for the penetration depth PD_R of red light B_R.

In this case, since the wavelengths grow in the order of the red light B_R, the green light B_G, and the blue light B_B, the penetration depth PD_R of the red light B_R may be deeper than the penetration depth PD_G of the green light B_G, and the penetration depth PD_G of the green light B_G may be deeper than the penetration depth PD_B of the blue light B_B.

Therefore, since the number (e.g., 3) of defects 121 in the penetration depth PD_G of the green light B_G includes the number (e.g., 1) of defects 121 in the penetration depth PD_B of the blue light B_B, a value (e.g., 2) obtained by subtracting the number (e.g., 1) of defects 121 in the penetration depth PD_B of blue light B_B from the number (e.g., 3) of defects 121 in the penetration depth PD_G of the green light B_G may be determined as the number or concentration of defects in a second area A2, and the number (e.g., 1) or concentration of defects in a first area A1 may be determined as the number (e.g., 1) of defects 121 of the blue light B_B with the penetration depth PD_B corresponding to the first area A1.

Similarly, since the number (e.g., 6) of defects 121 in the penetration depth PD_R of the red light B_R includes the number (e.g., 3) of defects 121 in the penetration depth PD_G of the green light B_G, a value (e.g., 3) obtained by subtracting the number (e.g., 3) of defects 121 in the penetration depth PD_G of the green light B_G from the number (e.g., 6) of defects 121 in the penetration depth PD_R of the red light B_R may be determined as the number or concentration of defects in a third area A3.

Through the above process, the number of defects 121 in each of the first area A1, the second area A2, and the third area A3 may be determined, and the concentration of defects in each area may be determined depending on the correlation between the volumes of each region and the number of defects 121.

In addition, by additionally irradiating the damage layer 120 with one or more lights with different penetration depths, the number or concentration of defects in a more detailed area may be known, and when the light irradiator 200 performs the same process while moving a position x and y where the light is radiated, the number of defects 121, the concentration of defects, and the depth of the damage layer for the entire damage layer 120 may be known.

Figure 5:
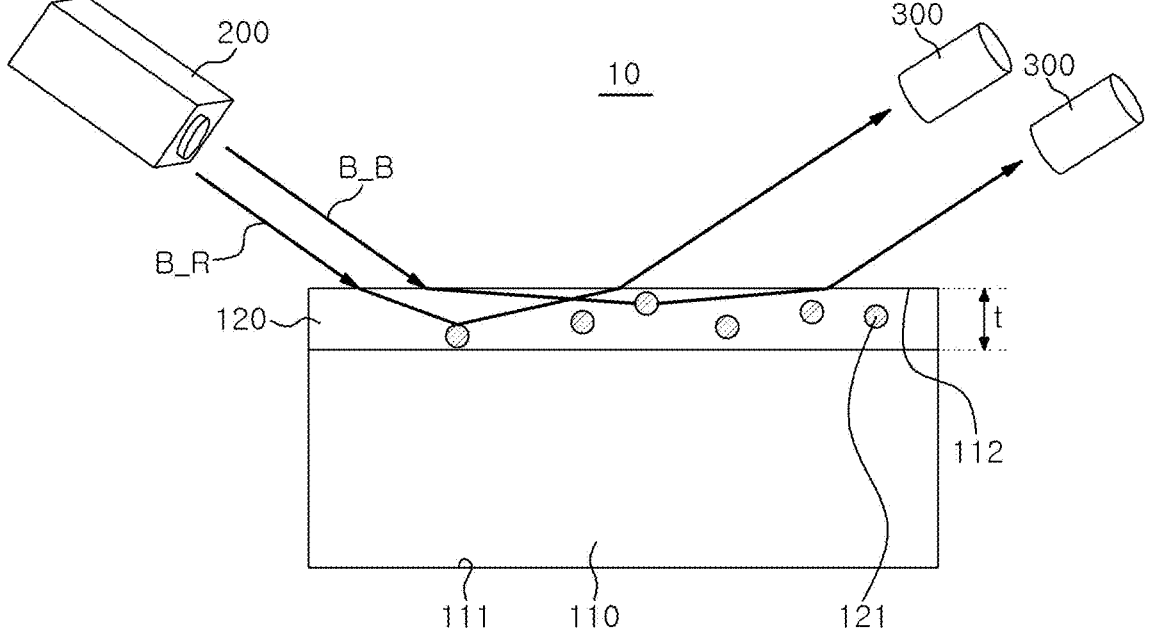
FIG. 5 illustrates a method of measuring a depth of a damage layer and a concentration of defects in the damage layer when the light irradiator radiates a plurality of lights with different wavelengths according to an embodiment of the present application.

FIG. 5 illustrates a method of measuring a depth of a damage layer and a concentration of defects in the damage layer when the light irradiator radiates a plurality of lights with different wavelengths according to an embodiment of the present application.

Referring to FIGS. 1, 2, and 5, the light irradiator 200 irradiates the damage layer 120 with light having different wavelengths, and the light detector 300 may detect lights reflected or scattered by the defects 121 on the surface or inside the damage layer 120.

The light irradiator 200 may sequentially irradiate the damage layer 120 with lights with different wavelengths. For example, the light irradiator 200 may radiate the blue light B_B at a first time and radiate the red light B_B at a second time after the first time. In this specification, one light irradiator 200 is illustrated as sequentially radiating lights with different wavelengths, but is not limited thereto. That is, according to the embodiment, each of two or more light irradiators 200 may radiate light with different wavelengths.

The light detector 300 may sequentially detect the blue light B_B and the red light B_R reflected or scattered by the defects 121. In this specification, the two light detectors 300 are illustrated as detecting the blue light B_B and the red light B_R, respectively, but are not limited thereto. That is, according to the embodiment, one light detector 300 including one or more phototubes may detect both the blue light B_B and red light B_R.

When the light detector 300 sequentially transmits the information on the blue light B_B and the information on the red light B_R, as described in FIG. 2, the determination device 400 may use the information on the received blue light B_B and the information on the received red light B_R to determine the number of defects in the damage layer 120, the concentration of defects, and the depth of the damage layer 120.

Figure 6:
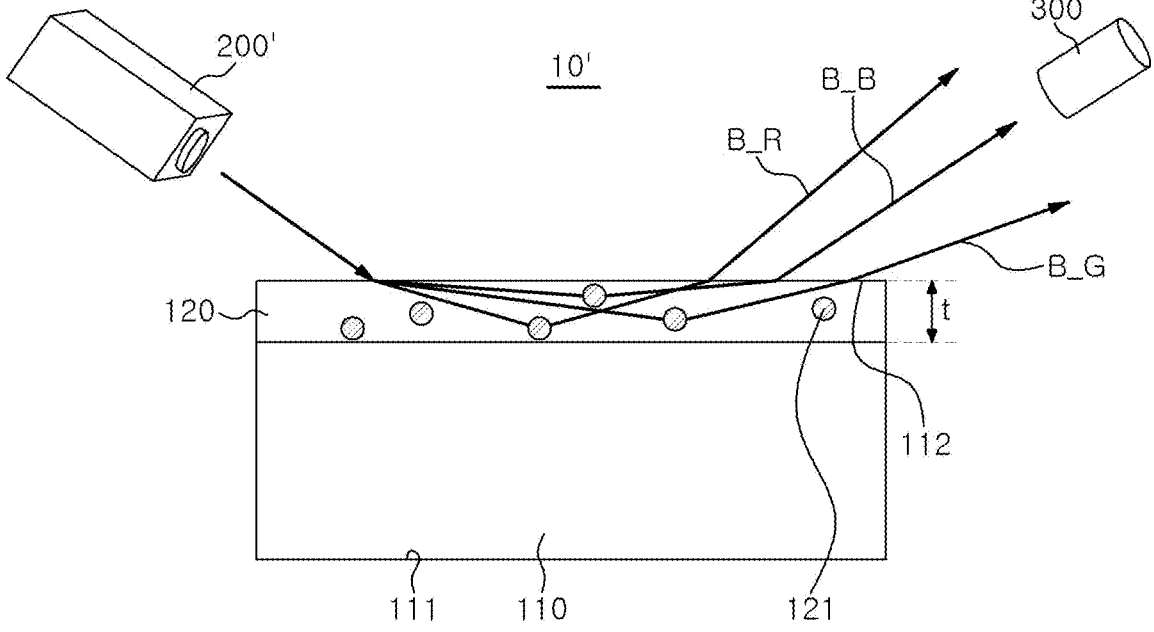
FIG. 6 illustrates a method of measuring a depth of a damage layer and a concentration of defects in the damage layer when the light irradiator radiates one light with different wavelengths according to another embodiment of the present application.

FIG. 6 illustrates a method of measuring a depth of a damage layer and a concentration of defects in the damage layer when the light irradiator radiates one light with different wavelengths according to another embodiment of the present application.

Referring to FIGS. 1, 2, and 6, a light irradiator 200' irradiates the damage layer 120 with a single light (e.g., white light) that can be dispersed into a plurality of lights with different wavelengths, and the light detector 300 may detect the light reflected or scattered by the defects 121 on the surface or inside the damage layer 120.

The light detector 300 may detect the blue light B_B and the red light B_R reflected or scattered by the defects 121. In this specification, one light detector 300 including a plurality of phototubes is illustrated as detecting all the blue light B_B, the green light B_G, and the red light B_R, but is not limited thereto. That is, according to the embodiment, a measurement system 10' includes the plurality of light detectors 300, and each of the plurality of light detectors 300 may detect one light.

When the light detector 300 transmits the information on the blue light B_B and the information on the red light B_R, as described in FIG. 2, the determination device 400 may use the information on the received blue light B_B and the information on the received red light B_R to determine the number of defects in the damage layer 120, the concentration of defects, and the depth of the damage layer 120.

Figure 7:
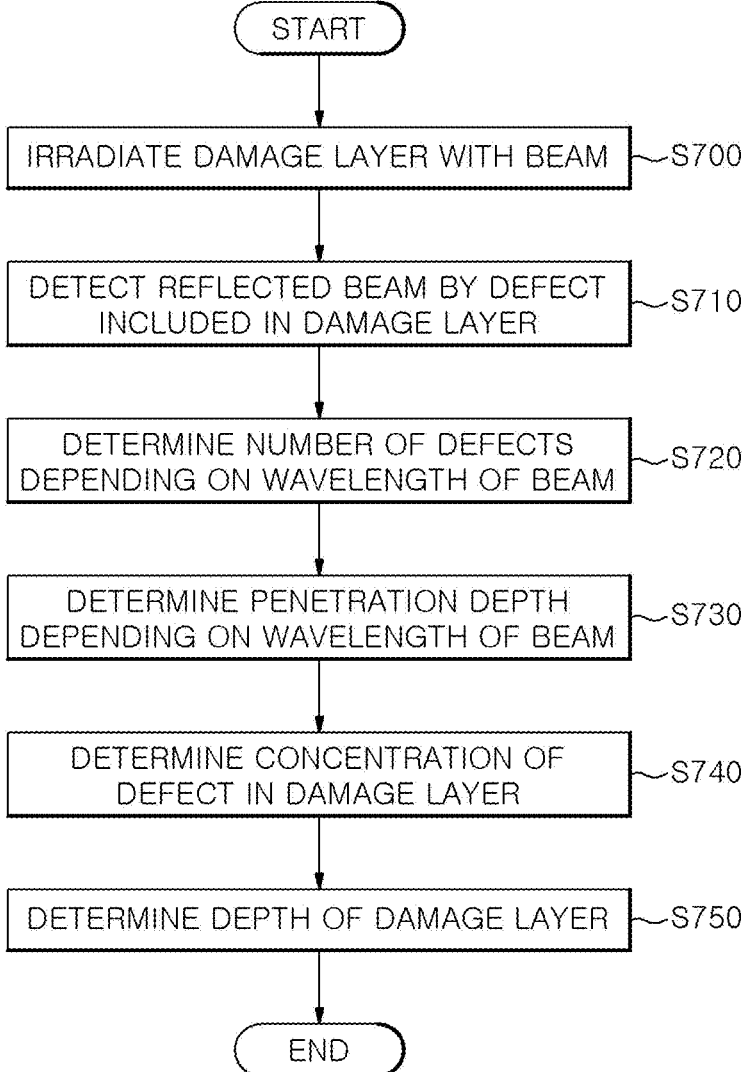
FIG. 7 is a flowchart illustrating a method of measuring a depth of a damage layer and a concentration of defects in the damage layer according to an embodiment of the present application.

FIG. 7 is a flowchart illustrating a method of measuring a depth of a damage layer and a concentration of defects in the damage layer according to an embodiment of the present application.

Referring to FIGS. 1, 2, and 7, when the light irradiator 200 radiates the light B to the damage layer 120 (S700), the light detector 300 may detect the light B reflected or scattered by the defects 121 on the surface or inside the damage layer 120 (S710).

When the determination device 400 receives the information on the light B from the light detector 300, the defect number determination unit 410 may use the information on the light B to determine the number or concentration of defects in the damage layer 120 detected at a predetermined position and range where the light B is radiated (S720).

The penetration depth determination unit 420 may determine the penetration depth of the light B based on the wavelength of the light B (S730).

The defect concentration determination unit 430 may determine the concentration of defects within the damage layer 120 at the predetermined position, range, and depth using the plurality of lights with different wavelengths (S740).

The damage layer depth determination unit 440 may determine the depth of the damage layer 120 using the defect concentration according to the depth of the damage layer 120 determined by the defect concentration determination unit 430 (S750).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

The invention claimed is:

1. A method of determining a depth of a damage layer formed on a back surface of a substrate, comprising:

irradiating the damage layer with a first light and a second light having a different wavelength from the first light;

detecting the first light and the second light reflected or scattered by defects in the damage layer;

determining a first penetration depth of the first light and a second penetration depth of the second light based on a first wavelength of the first light and a second wavelength of the second light;

determining a number of defects present in a first area corresponding to the first penetration depth or a concentration of defects present in the first area using the detected first light;

determining a number of defects present in a second area corresponding to the second penetration depth or a concentration of defects present in the second area using the detected second light;

determining a number of defects or a concentration of defects present in a third area that is included in the first area but is not included in the second area using the number of defects or the concentration of defects present in the first area and the number of defects or the concentration of defects present in the second area; and determining the depth of the damage layer based on the number of defects or a graph of the concentration of defects and the depth of the damage layer, the concentration of defects present in each of the first, second, and third areas, wherein the graph represents a normal distribution curve, wherein when the first wavelength is longer than the second wavelength, the first penetration depth is deeper than the second penetration depth, wherein in determining the depth of the damage layer, when first information indicated by the detected first light and second information indicated by the detected second light are the same, the second penetration depth is determined as the depth of the damage layer, and wherein in determining the depth of the damage layer, when the number of defects or the concentration of defects for the first penetration depth and the number of defects or the concentration of defects for the second penetration depth are the same, the second penetration depth is determined as the depth of the damage layer.

2. The method of claim 1, further comprising:

determining the concentration of defects in the first area using the number of defects or the concentration of defects present in the first area;

determining the concentration of defects in the second area using the number of defects or the concentration of defects present in the second area; and determining the concentration of defects in the third area using the number of defects or the concentration of defects present in the third area.

3. The method of claim 1, wherein in irradiating the damage layer with the first light and the second light, the first light and the second light are simultaneously irradiated to the damage layer, and the first light and the second light correspond to light dispersed from white light.

4. The method of claim 1, wherein in irradiating the damage layer with the first light and the second light, the first light and the second light are sequentially irradiated.

5. The method of claim 1, wherein the substrate is a silicon substrate.

6. A measurement system for determining a depth of a damage layer formed on a back surface of a substrate, comprising:

a light irradiator configured to irradiate the damage layer with a first light and a second light having a different wavelength from the first light;

a light detector configured to detect the first light and the second light reflected or scattered by defects in the damage layer; and a determination device configured to receive information on the first light and information on the second light from the light detector, wherein the determination device is configured to:

determine a first penetration depth of the first light and a second penetration depth of the second light based on a first wavelength of the first light and a second wavelength of the second light, determine a number of defects present in a first area corresponding to the first penetration depth or a concentration of defects present in the first area using the detected first light, determine a number of defects present in a second area corresponding to the second penetration depth or a concentration of defects present in the second area using the detected second light, determine a number of defects or a concentration of defects present in a third area that is included in the first area but is not included in the second area using the number of defects or the concentration of defects present in the first area and the number of defects or the concentration of defects present in the second area, and determine the depth of the damage layer based on the number of defects or a graph of the concentration of defects and the depth of the damage layer, the concentration of defects present in each of the first, second, and third areas, wherein the graph represents a normal distribution curver, wherein when the first wavelength is longer than the second wavelength, the first penetration depth is deeper than the second penetration depth, wherein when first information indicated by the detected first light and second information indicated by the detected second light are the same, the second penetration depth is determined as the depth of the damage layer, and wherein when the number of defects or the concentration of defects for the first penetration depth and the number of defects or the concentration of defects for the second penetration depth are the same, the second penetration depth is determined as the depth of the damage layer.

* * * * *